United States Patent [19]

Adasek et al.

[11] Patent Number: 4,794,537
[45] Date of Patent: Dec. 27, 1988

[54] SCHEDULED COMFORT CONTROL SYSTEM WITH ADAPTIVE COMPENSATION FOR STALL AND OVERSHOOT

[75] Inventors: Kenneth P. Adasek, Sterling Heights; William L. Drayer, Romeo; Edward W. Yott, Fraser, all of Mich.

[73] Assignee: General Motors Corporation, Detroit, Mich.

[21] Appl. No.: 44,006

[22] Filed: Apr. 29, 1987

[51] Int. Cl.$^4$ ................ G06F 15/20; G06F 15/14; B60H 1/00
[52] U.S. Cl. ................ 364/424.05; 237/5
[58] Field of Search .......... 364/424; 236/91 R, 91 D, 236/DIG. 8; 237/2 R, 2 A, 5, 8 A, 28, 32

[56] References Cited

U.S. PATENT DOCUMENTS

| | | | |
|---|---|---|---|
| 3,263,739 | 8/1966 | Gaskill et al. | 237/8 A X |
| 3,373,934 | 3/1968 | Kolbe et al. | 236/13 |
| 4,316,251 | 2/1982 | Saito et al. | 364/424 |
| 4,381,074 | 4/1983 | Iijima et al. | 236/91 R X |
| 4,408,278 | 10/1983 | Saito et al. | 364/424 |

Primary Examiner—Eugene R. LaRoche
Assistant Examiner—David Mis
Attorney, Agent, or Firm—Mark A. Navarre

[57] ABSTRACT

An automatic HVAC control system having a scheduled control in which the HVAC control variables are regulated in accordance with an empirically determined schedule to provide a desired comfort level in the vehicle, and an adaptive control which modifies the scheduled control when stall or overshoot conditions occur so that the design performance level of the system is achieved under all conditions.

10 Claims, 12 Drawing Sheets

SCHEDULED COMFORT CONTROL SYSTEM WITH ADAPTIVE COMPENSATION FOR STALL AND OVERSHOOT

This invention relates to automatic control of a motor vehicle heating, ventilation and air conditioning (HVAC) system, and more particularly to a method of control for maintaining a selected comfort level in the vehicle.

Automatic HVAC control systems have been in use in motor vehicles for many years. Generally, a number of control variables are regulated, including air conditioning capacity, heater capacity, temperature mix door position, blower speed and air source (that is, outside or inside). In a typical system, various combinations of the control variables are adjusted in accordance with an empirically determined schedule based on a desired temperature setting (open loop), or the deviation of a measured in-car temperature from the desired temperature setting (closed loop).

Moreover, it is generally known that other factors should be considered, including in-car humidity, outlet air temperature, blower speed, etc. See, for example, the U.S. Patent Gaskill et al. U.S. Pat. No. 3,263,739, issued Aug. 2, 1966, and assigned to the assignee of the present invention. A control that takes such factors into account is referred to as a comfort control as opposed to simple temperature control.

However, the performance of the systems referred to above is limited by the accuracy of the control variable scheduling. Although such scheduling is empirically determined to provide an acceptable (design) performance level, experience has shown that there are countless other factors at work which would be difficult, if not impossible, to account for. In performance terms, these factors often result in a stall (undercapacity) condition in which the control is unable to bring the actual temperature into correspondence with the desired temperature, or an overshoot (overcapacity) condition in which the control drives the actual temperature past the desired temperature.

The present invention is directed to an improved automatic HVAC control system having a scheduled control in which the HVAC control variables are regulated in accordance with an empirically determined schedule, and an adaptive control in which the scheduled control is modified when stall or overshoot conditions occur so that the design performance level of the system is achieved under all conditions.

The scheduled control regulates the HVAC control variables in accordance with a number of factors, including the desired comfort setting, the in-car temperature, the ambient temperature, the air velocity, the in-car humidity, a clothing factor and a radiant load factor. When properly combined, these factors are used to determine the actual comfort temperature in the vehicle and the comfort temperature error which the system must overcome. The error, in turn, determines the commanded settings of the HVAC control variables. Under normal conditions, the scheduled control regulates the heating/cooling capacity of the HVAC system at a substantially optimum level for providing high performance comfort control.

However, when the heating/cooling capacity brought about by the scheduled control significantly deviates from the optimum level, resulting in an uncorrected comfort temperature error, the adaptive control biases the scheduled control toward the optimum level. This serves to adaptively correct the operation of the HVAC control elements for variations in the system performance and the heating/cooling requirements of the vehicle which are not accounted for by the scheduled control.

If the actual comfort temperature deviates from the desired comfort setting by more than a threshold (deadband) amount, the adaptive control computes the relative rate of change in comfort temperature error to determine if the system is experiencing a stall condition or an overshoot condition. If an overshoot condition is indicated, the scheduled control is modified in relation to the rate of change in the comfort temperature error. If a stall condition is indicated, the scheduled control is modified in relation to the comfort temperature error.

The control of this invention is set forth in the context of a four-place system in which the HVAC control variables are regulated to independently control the temperature and air velocity at four seat locations (right-front, left-front, right-rear and left-rear) of a vehicle. However, it should be understood that the control of this invention is equally applicable to a two-place or a conventional one-place system.

Figure 1:
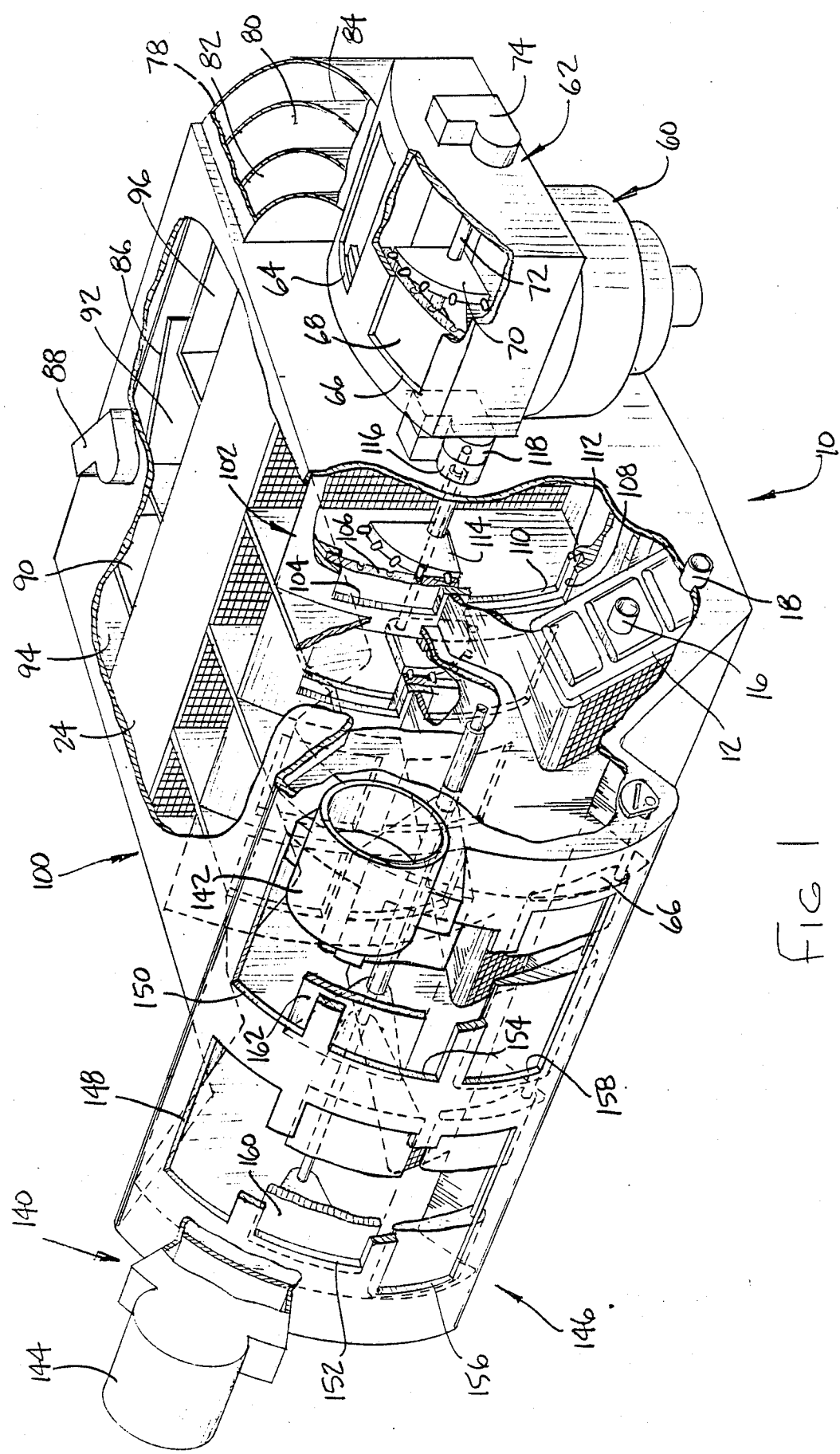
FIG. 1 is a cutaway view of a motor vehicle heating ventilation and air conditioning (HVAC) control assembly.
Figure 2:
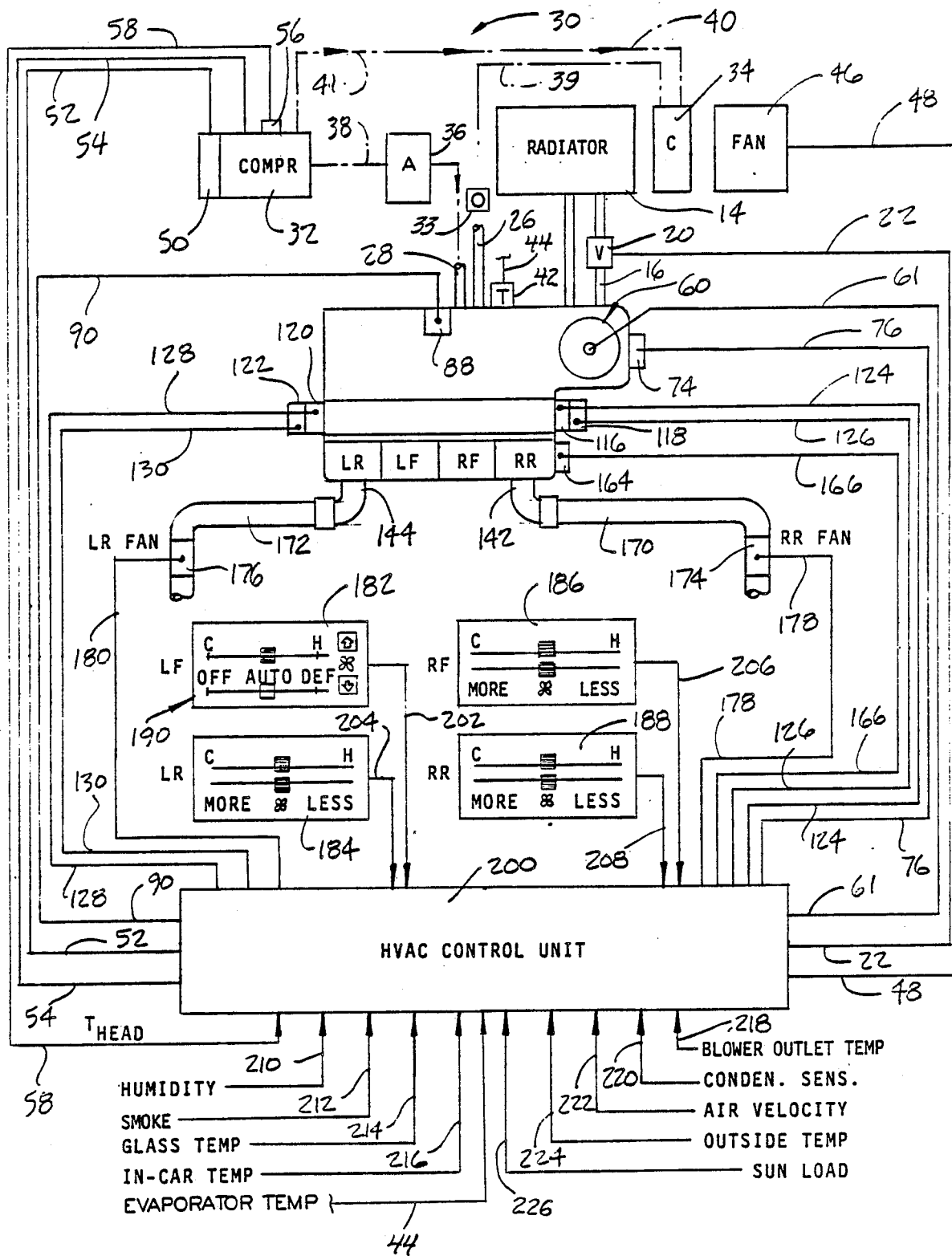
FIG. 2 is a schematic diagram of a motor vehicle HVAC control system including the control assembly depicted in FIG. 1 and a computer based HVAC CONTROL UNIT for carrying out the control functions of this invention.

Referring now to the drawings, and more particularly to FIGS. 1 and 2, the reference numeral 10 generally designates the control assembly of a motor vehicle HVAC system. The control assembly 10 is shown in some detail in FIG. 1 and is generally depicted in the system diagram of FIG. 2. The control assembly 10 comprises a heater core 12 coupled to the cooling system or radiator 14 of the motor vehicle via the supply and return hoses 16 and 18. An electrically activated water valve 20 is connected to the supply hose 16 between the heater core 12 and the radiator 14; its operation is controlled by an electrical control signal on line 22 to open or close the coolant supply hose 16.

The control assembly 10 also includes an evaporator core 24 which communicates with a motor vehicle air conditioning system via the refrigerant supply and return hoses 26 and 28. The air conditioning system is schematically depicted in FIG. 2 and is generally designated by the reference numeral 30. In addition to the evaporator core 24, the air conditioning system 30 includes a refrigerant compressor (COMPR) 32, an orifice (O) 33, a condenser (C) 34 and an accumulator (A) 36. The various elements are connected for refrigerant flow as schematically designated by the broken lines 38–41. A temperature sensor (T) 42 disposed in the vicinity of evaporator core 24 provides an electrical indication of the evaporator temperature on line 44.

The condenser 34 is located in close proximity to the radiator 14. In operation, both the condenser 34 and the radiator 14 are located in the airstream of an engine cooling fan 46, the speed of which is controlled by an electrical control signal on line 48.

The compressor 32 is a variable displacement unit and is adapted to be belt-driven by the vehicle engine through an intermediate electromagnetic clutch 50. The state of the clutch 50 is controlled by the clutch signal on line 52 and the dsiplacement of the compressor 32 is controlled by the displacement signal on line 54. For control purposes, a temperature sensor 56 is disposed on the compressor 32 to sense the refrigerant outlet temperature and to provide an electric signal in accordance therewith on line 58.

The primary ventilation airflow for the HVAC system is provided by a variable speed blower motor and impeller, generally designated by the reference numeral 60. An inlet air control assembly, generally designated by the reference numeral 62, determines the source of the inlet air. The air control assembly 62 includes a first port 64 connected to obtain outside air, and a port 66 connected to obtain air from within the passenger compartment of the vehicle.

A shutter 68 is slidably mounted in a track 70 in proximity to the ports 64 and 68 for selecting the source of the inlet air. The shutter 68 is engaged by the teeth of a drive gear 70, which in turn, is adapted to be driven by the output shaft 72 of a servomotor 74. The servomotor 74 is suitably energized by an electrical control signal on line 76 for moving the shutter 68 to control the proportion of inside and outside air.

The outlet air of the blower 60 is directed into the control assembly 10 through a flow divided duct 78. The duct 78 divides the flow into three components. Air for both front passengers is directed through the main chamber 80. Air for the right rear passenger is directed through the side chamber 82, and air for the left rear passenger is directed through the side chamber 84. The front passenger air is proportioned between the right and left side of the vehicle by an air diverter door 86 driven by the servomotor 88. The servomotor 88 is controlled by an electrical control signal on line 90 in accordance with the driver and right front passenger control settings.

Downstream of the air diverter door 86 the inlet air is thus divided into four compartments: a driver compartment 90, a passenger compartment 92, a left-rear compartment 94 and a right-rear compartment 96. All of the inlet air entering the control assembly 10 is passed through the condenser core 24. A four segment temperature door assembly, generally designated by the reference numeral 100, then divides the compartmentalized air to either pass through or bypass the heater core 12.

Each segment of the temperature door assembly 100 is substantially identical. The segment 102, for example, includes an upper port 104, a lower port 106 and a shutter 108 slidable in a track 110 to determine the proportion of air which passes through the heater core 12. The shutter 108 is engaged by the teeth of a drive gear 114 adapted to be rotatably driven by the servomotor 116. The servomotors 116 and 118 and the servomotors 120 and 122 may be ganged as indicated, using a hollow shaft to drive the shutters in the rear passenger segments. The servomotors 116-122 are controlled by the electric control signals on lines 124-130 to control the position of the various shutters.

The air passed through the heater core 12 is then combined with the bypassed air and is directed into the passenger compartment of the vehicle through a mode door assembly, generally designated by the reference numeral 140. Air intended for the rear passengers is channeled directly to the outlet ducts 142 and 144, while air intended for the front passengers is directed through a two-segment mode door assembly, generally designated by the reference numeral 146.

The mode door assembly 146 directs the outlet air through either an upper pair of ducts 148, 150 for defrost, a middle pair of ducts 152, 154 for vent, or a lower pair of ducts 156, 158 for a heat mode.

Proportioning of the compartmentalized air between the upper and middle duct of each segment is controlled by a shutter arrangement similar to that descirbed in reference to the temperature door assembly 100. The mode door shutters 160 and 162 are operated together by a single servomotor 164 through a drive gear arrangement similar to that described above. The servomotor 164 also controls the position of a heater mode door 166 to variably expose the lower air ducts 156, 158 depending on the position of the shutters 160 and 162.

Following discharge through the ducts 142 and 144, the outlet air for the right-rear and left-rear passengers is channeled to the rear passenger compartments of the vehicle by a pair of extended ducts 170 and 172. Auxiliary fans 174 and 176 are provided in the ducts 170 and 172 to augment the rear passenger airflow, if desired. The speed of the auxiliary fans 174 and 176 is controlled by the electrical control signals on lines 178 and 180, respectively.

The primary input for regulating the operation of the HVAC control elements described above is provided by the control panels 182-188. The passenger control panels 184-188 are all alike; each provides for passenger setting of the relative airflow (more/less) and the relative comfort temperature (C/H). The driver control panel 182 likewise includes dials for adjusting the desired relative comfort temperature (C/H) and the relative airflow (up/down arrows), but also includes a dial, as designated by the reference numeral 190, for controlling the HVAC mode of operation.

When the dial 190 is moved to its leftmost position (OFF), the HVAC system is disabled; when moved to the middle position (AUTO), the HVAC system is automatically controlled to achieve the desired comfort temperature; and when the dial 190 is moved to its rightmost position (DEF), a defrost mode is engaged. The dial 190 may be positioned intermediate the AUTO and DEF positions to proportion the driver and front passenger airflow between the normally selected ducts and the defrost ducts 148 and 150.

The reference numeral 200 designates a computer based HVAC CONTROL UNIT for regulating the operation of the various HVAC elements described above for achieving the desired comfort temperature at each of the four passenger locations in the motor vehicle. Thus, CONTROL UNIT 200 regulates the operation of the air conditioning compressor 32 via the lines 52 and 54; it regulates the operation of the air diverter door 86 via line 90; it regulates the operation of the temperature door assembly 100 via the lines 124-130; it operates the engine cooling fan 46 via line 48; it operates the water valve 20 via line 22; it controls the speed of blower motor 60 via line 61; it controls the proportioning of inlet air between inside and outside via line 76; it controls the operation of the mode door assembly 146 via line 166; and it controls the speed of the rear passenger compartment fans 174 and 176 via lines 178–180.

In performing the above control, CONTROL UNIT 200 receives inputs from the control panels 182–188 via lines 202–208, an indication of the compressor head temperature $T_{HEAD}$ via line 58 and an indication of the evaporator temperature via line 44. Input signals indicative of various other parameters including the relative humidity in the vehicle, the presence of smoke in the passenger compartment, the temperature of the vehicle glass (windshield), the in-car temperature, the blower outlet air temperature, a windshield moisture indication, the relative outlet air velocity, the outside air temperature, and the sun loading are provided as indicated by the input lines 210–226. Indications of such parameters are obtained using conventional transducer technology.

Figure 3A:
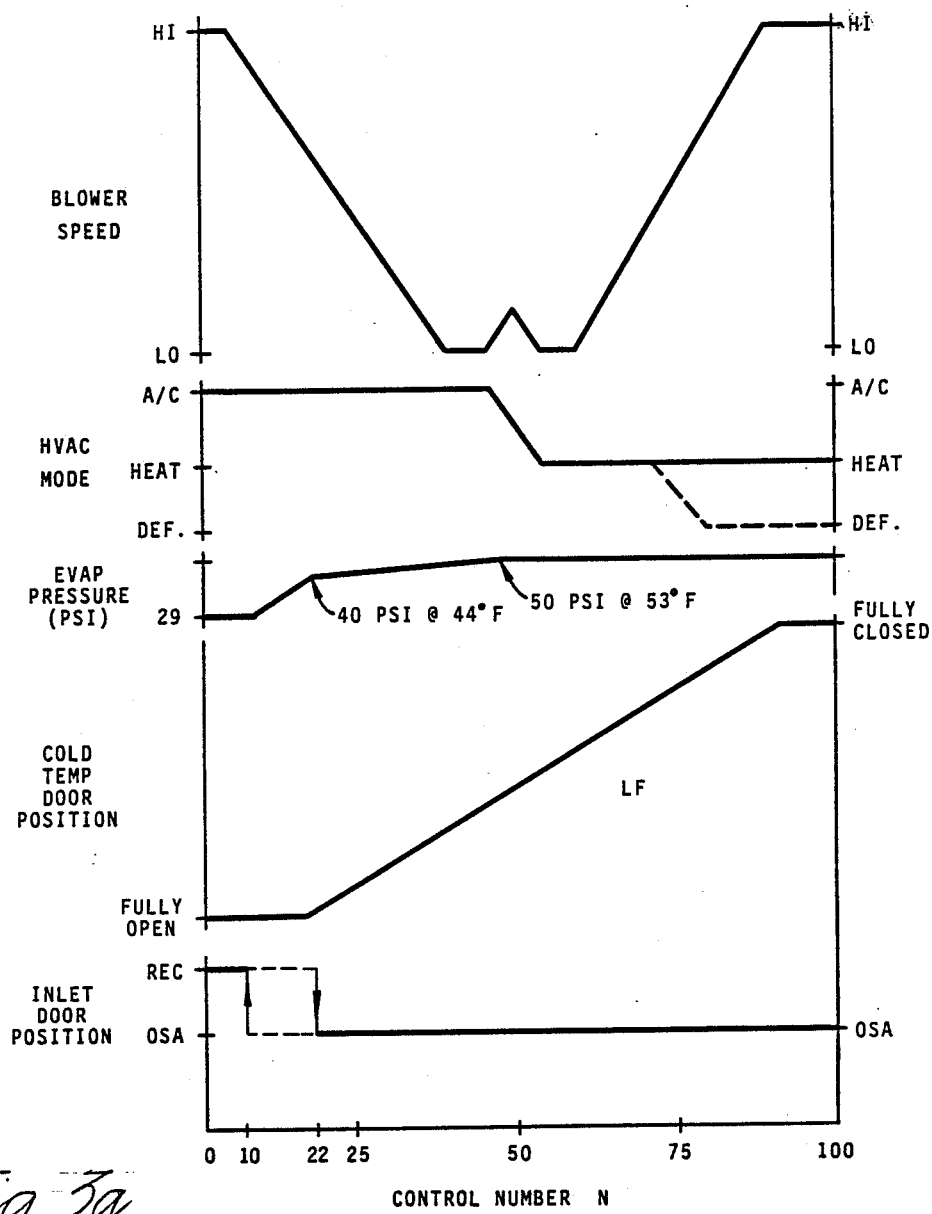
FIGS. 3a and 3b are graphs depicting the operation of the scheduled and adaptive controls according to this invention.

FIG. 3a depicts the scheduled control of the blower motor 60, the mode door assembly 146, the compressor displacement, the temperature door assembly 100 and the inlet door control assembly 62. The control for each such element or assembly depends on the value of a control number N determined by CONTROL UNIT 200 in response to the various operating parameters referred to above in reference to FIG. 2. As described below, the control number N is determined by the thermal requirement necessary to maintain the desired comfort temperature.

Certain of the controls are set solely in accordance with the settings of the driver control panel 182; other controls are set in accordance with the individual settings of the passenger control panels 184–188. For example, the driver control panel 182 determines the setting of the blower motor speed, the HVAC mode, the compressor displacement and the inlet door position. The settings of the passenger control panels 184–188 are used to individually determine the various temperature door settings, the air diverter door position and the auxiliary rear compartment fan speeds.

The control schedule defined by the graph of FIG. 3a is empirically determined in conjunction with the control number N to achieve a high level of system performance in achieving and maintaining the desired comfort temperature(s) within the vehicle. However, as indicated above, it is recognized that certain system variables are difficult, if not impossible, to take into consideration and the HVAC system at times experience an overcapacity condition or an undercapacity condition. If an undercapacity condition occurs, the system is unable to achieve the desired comfort setting and is said to be stalled. If an overcapacity condition occurs, the system overshoots the desired comfort setting.

To overcome the inevitable system deficiencies described above, the HVAC system according to this invention includes an adaptive control for adjusting the control number N to modify the system performance in the event that an overcapacity or undercapacity condition is detected. The modification range is defined graphically in FIG. 3b where the horizontal scale represents temperature in degrees F. At the center of the scale is the desired comfort temperature setting D selected by the driver of the vehicle.

Deviation of the actual comfort temperature $T_c(ACT)$ from the desired comfort temperature D is represented by the temperature error $E_T$. As indicated by the modification range, the adaptive control of this invention is enabled whenever the temperature error $E_T$ is within a window of plus or minus 10 degrees F. from the driver setting D. Once that criteria is met, the rate of change of the temperature error $E_T$ is monitored to detect if an undercapacity (stall) or overcapacity (overshoot) condition is present. If an overcapacity condition is detected, the adaptive control adjusts the control number N to reduce the system capacity (heating or cooling). If an undercapacity condition is detected, the adaptive control adjusts the control number N to increase the system capacity (heating or cooling).

Figure 3B:
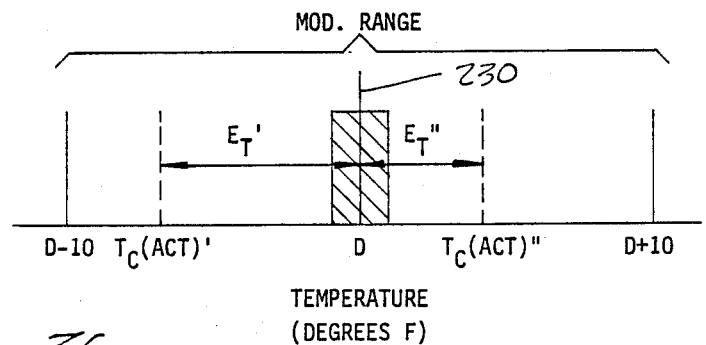

The adjustment of the adaptive control remains in effect so long as the overcapacity or undercapacity condition persists, or until the error $E_T$ is reduced to within a deadband of values about the desired setting, as indicated by the shaded area 230 in FIG. 3b. In this way, the automatic HVAC control of this invention is able to achieve and maintain the passenger compartment of the vehicle at the desired comfort setting(s).

Figure 4:
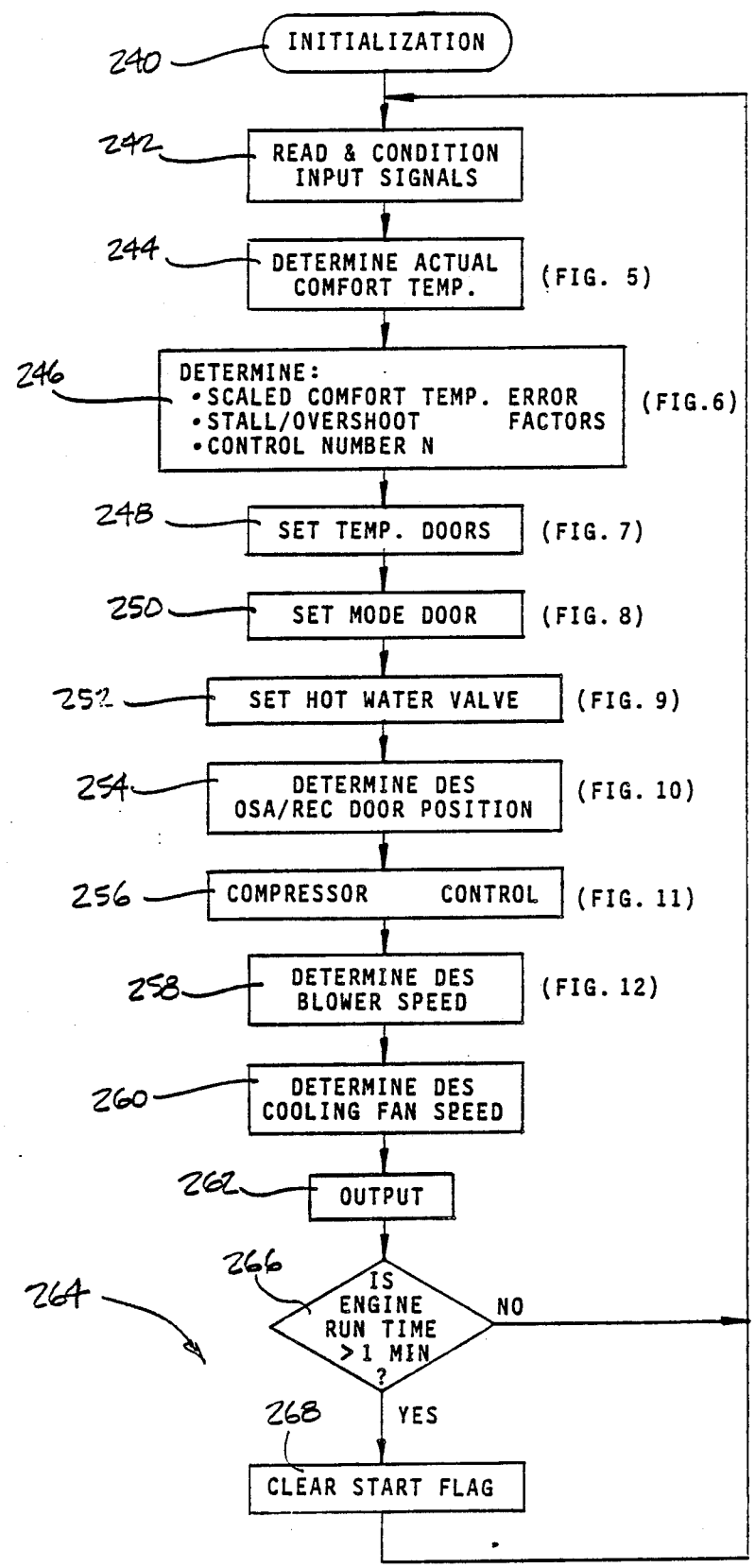
FIGS. 4–12 are flow diagrams representative of suitable program instructions executed by the HVAC CONTROL UNIT of FIG. 2 in carrying out the control functions of this invention.

In carrying out the control described above, the HVAC CONTROL UNIT 200 executes a series of computer programs and subroutines. Such programs and subroutines are represented by the flow diagrams of FIGS. 4–12. The flow diagram of FIG. 4 represents an executive or main loop program which initializes the operation of the system and directs the execution of various control routines specific to the various control elements of the HVAC system. Such routines are depicted in the flow diagrams of FIGS. 5–12, as indicated in FIG. 4.

Referring now specifically to the main loop diagram of FIG. 4, the reference numeral 240 designates a series of program instructions executed at the initiation of vehicle operation for initializing the various registers and outputs of CONTROL UNIT 200. Thereafter the instruction block 242 is executed to read and condition the various system inputs defined in reference to FIG. 2. This operation may require filtering, switch debouncing and/or analog-to-digital conversion. Thereafter the instruction block 244 is executed to determine the actual comfort temperature in the vehicle. This operation is set forth in detail in the flow diagram of FIG. 5 as indicated.

Figure 6:
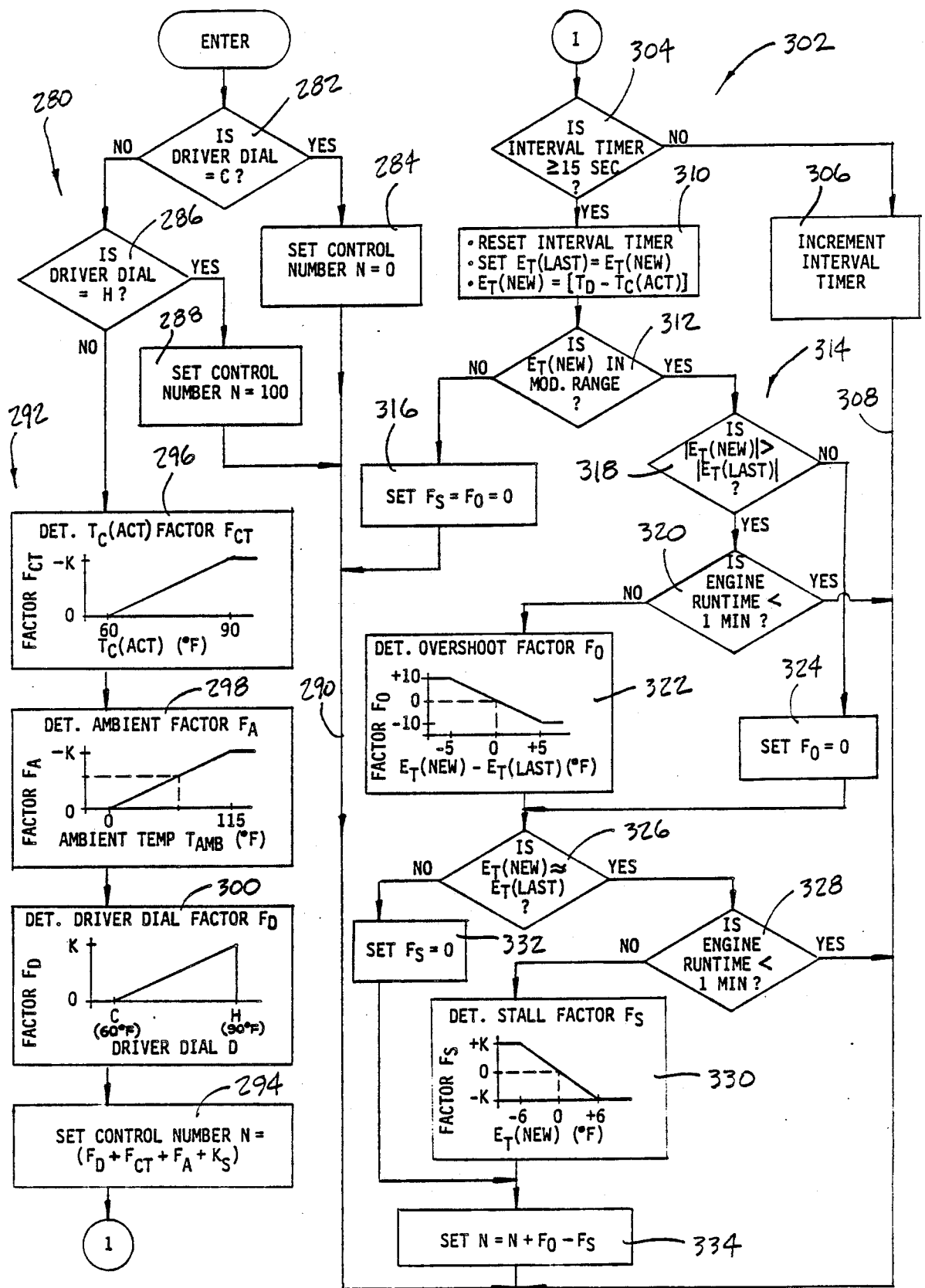

The instruction block 246 is directed to the heart of this invention and pertains to the determination of a control number N. As indicated above, such determination involves a determination of the comfort temperature error $E_T$ and a possible adjustment of the control number N if stall or overshoot conditions are detected. A more detailed flow diagram of this function is depicted in FIG. 6 as indicated.

The instruction blocks 248–260 are executed in series as indicated to set the shutter positions of the temperature door assembly 100; to set the shutter positions of the mode door assembly 146; to set the position of water valve 20; to set the shutter position of the inlet door control assembly 62; to control the refrigerant compressor 32; to determine the desired speed of blower motor 60; and to determine the desired speed of the engine cooling fan 46.

Figure 7:
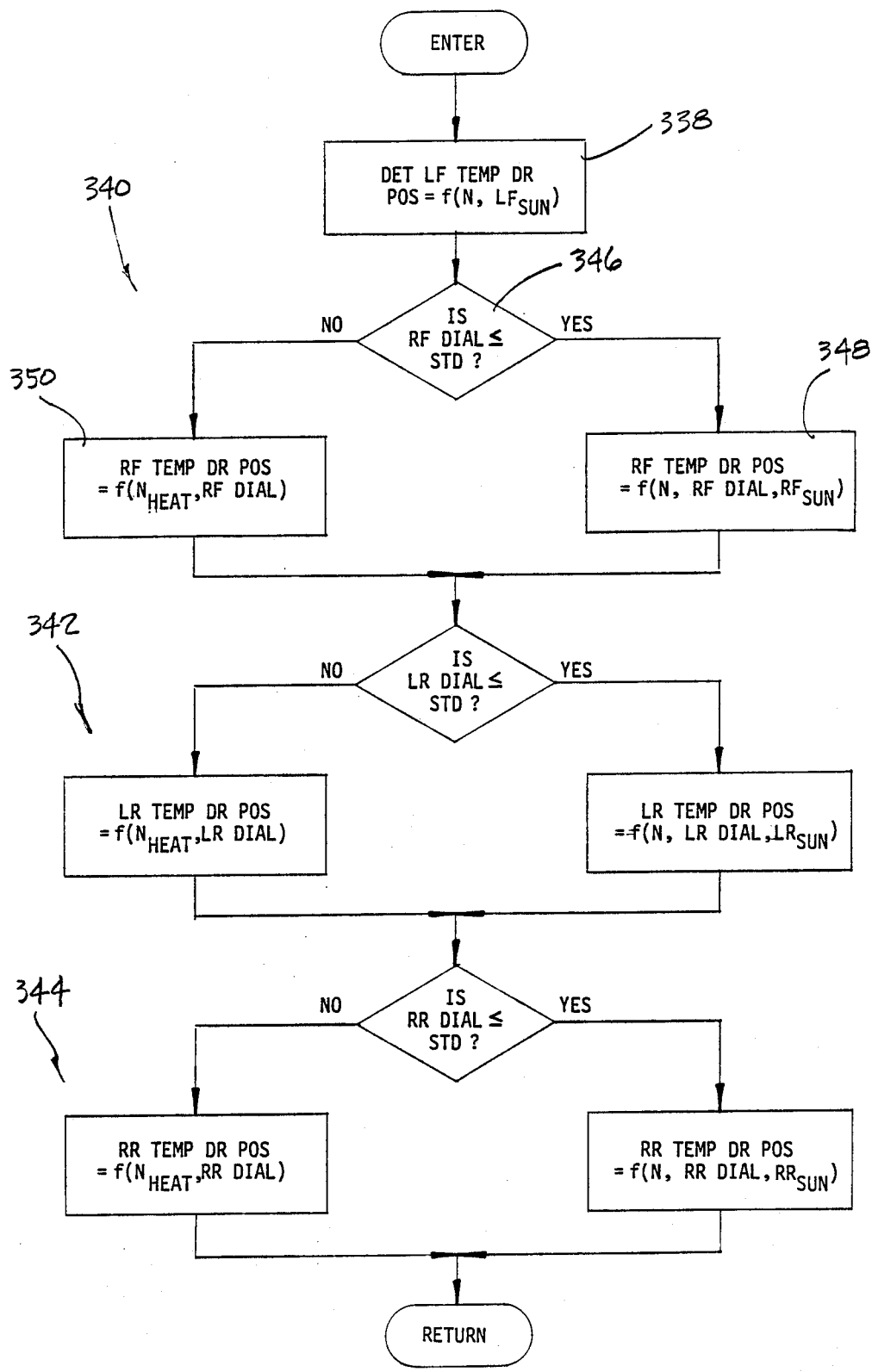
Figure 8:
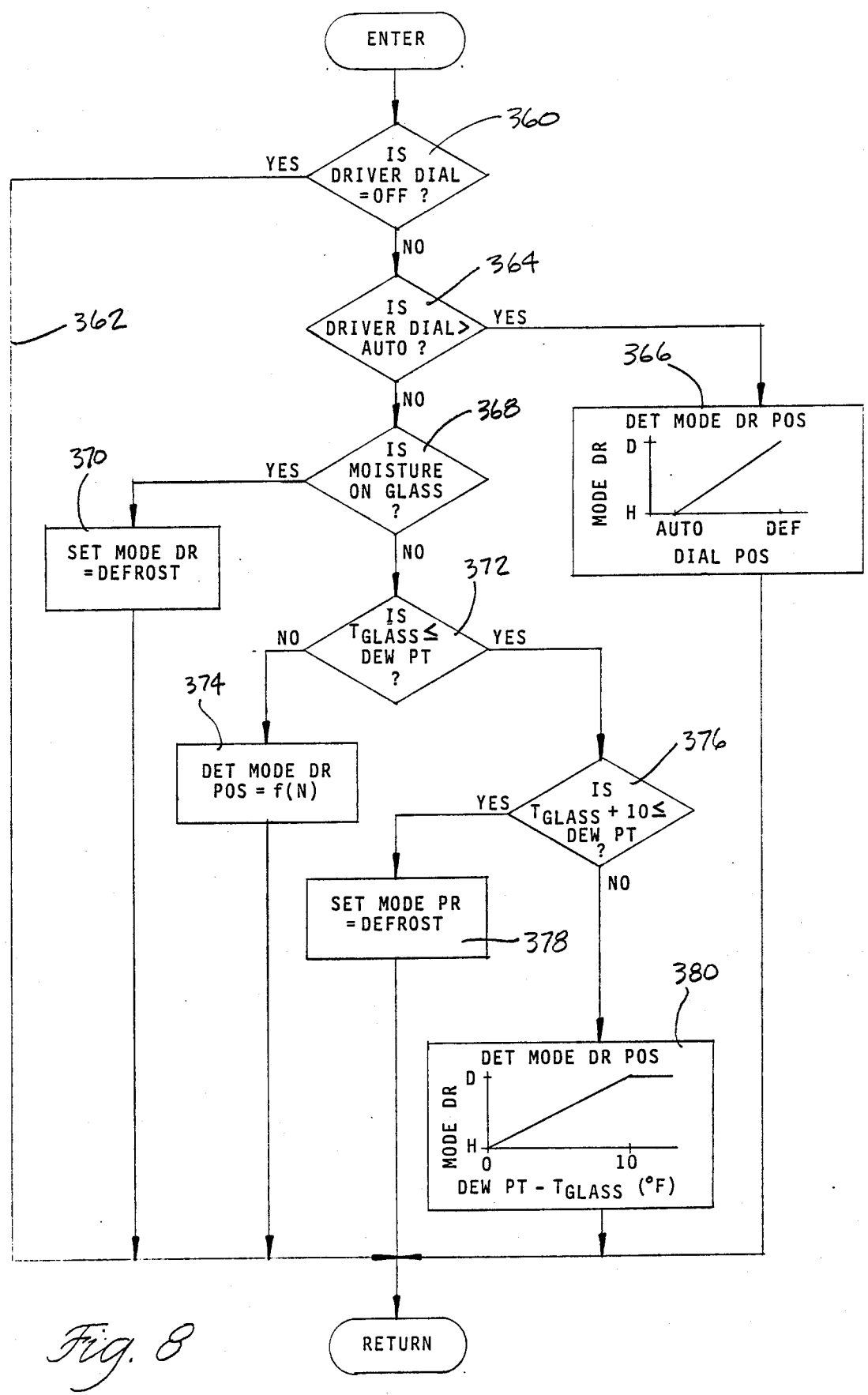
Figure 9:
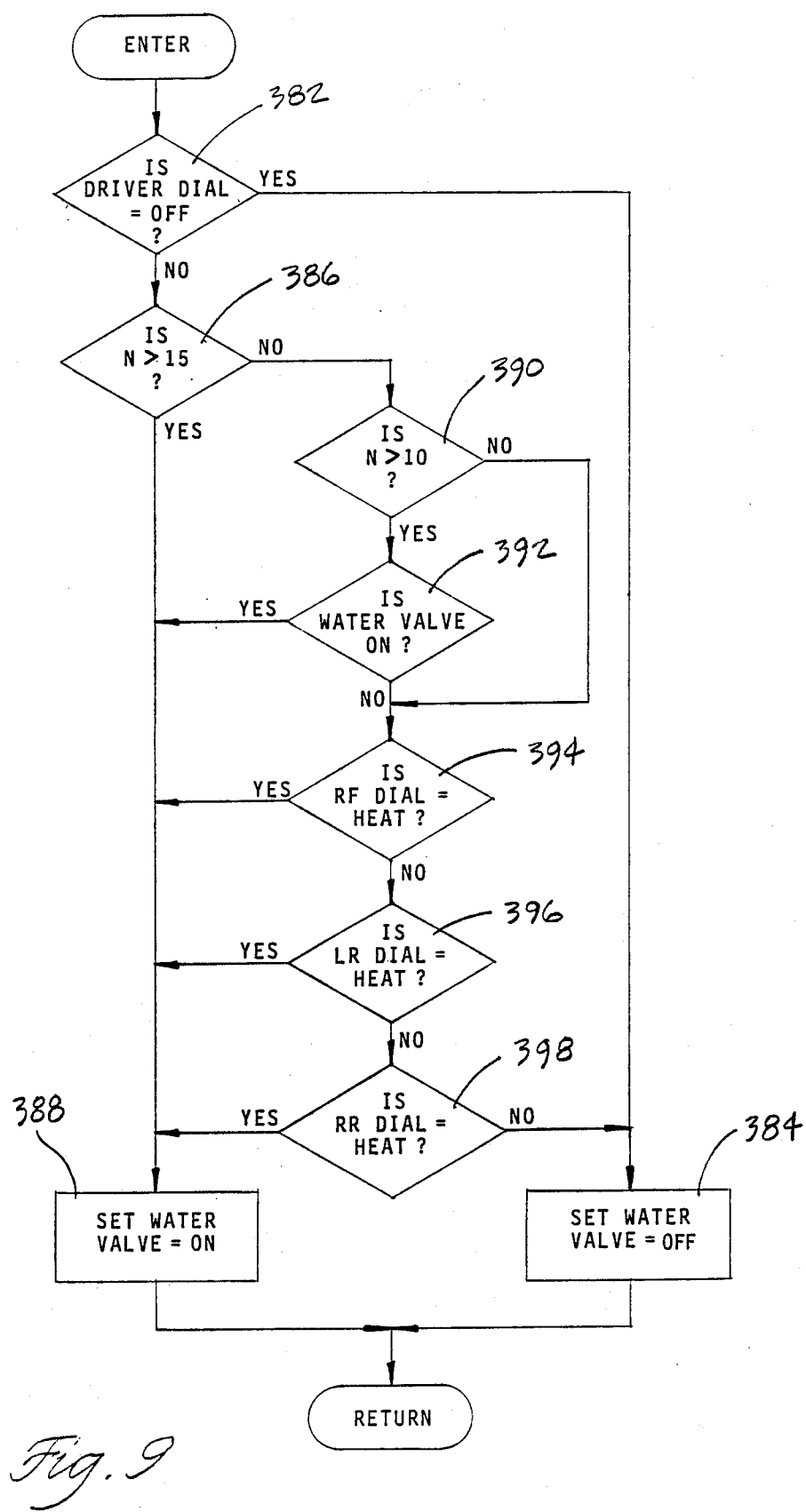
Figure 10:
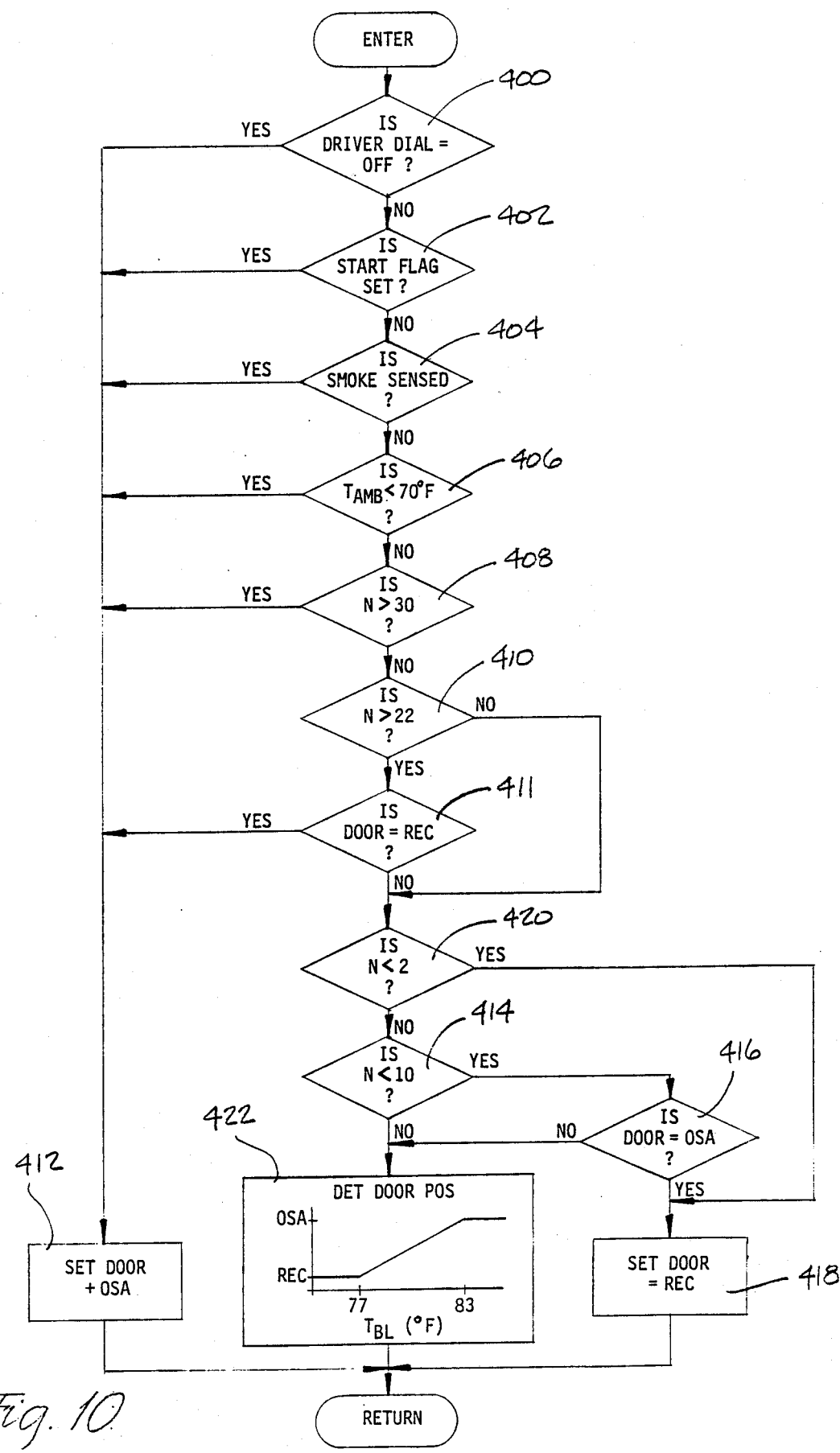
Figure 11:
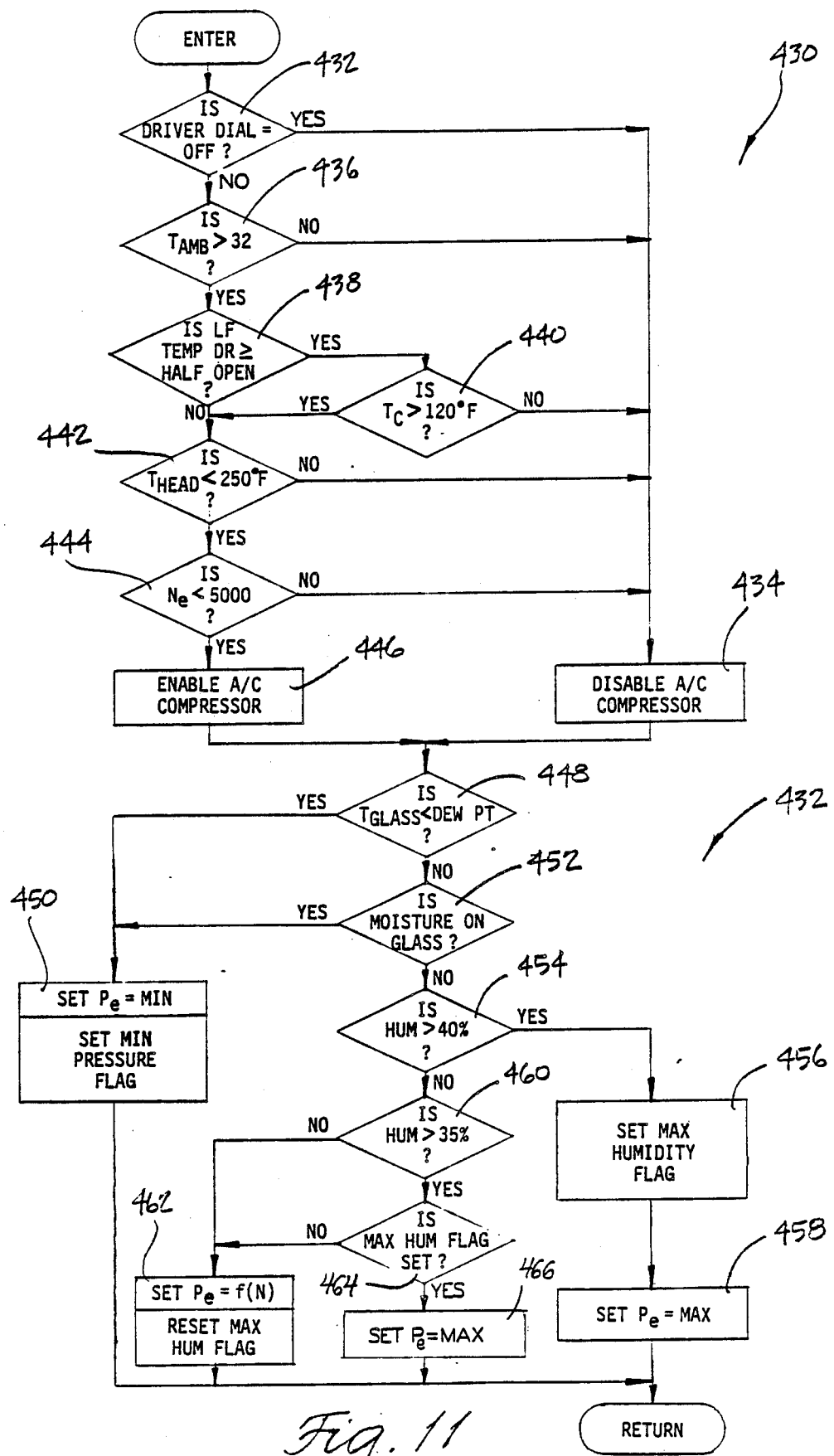
Figure 12:
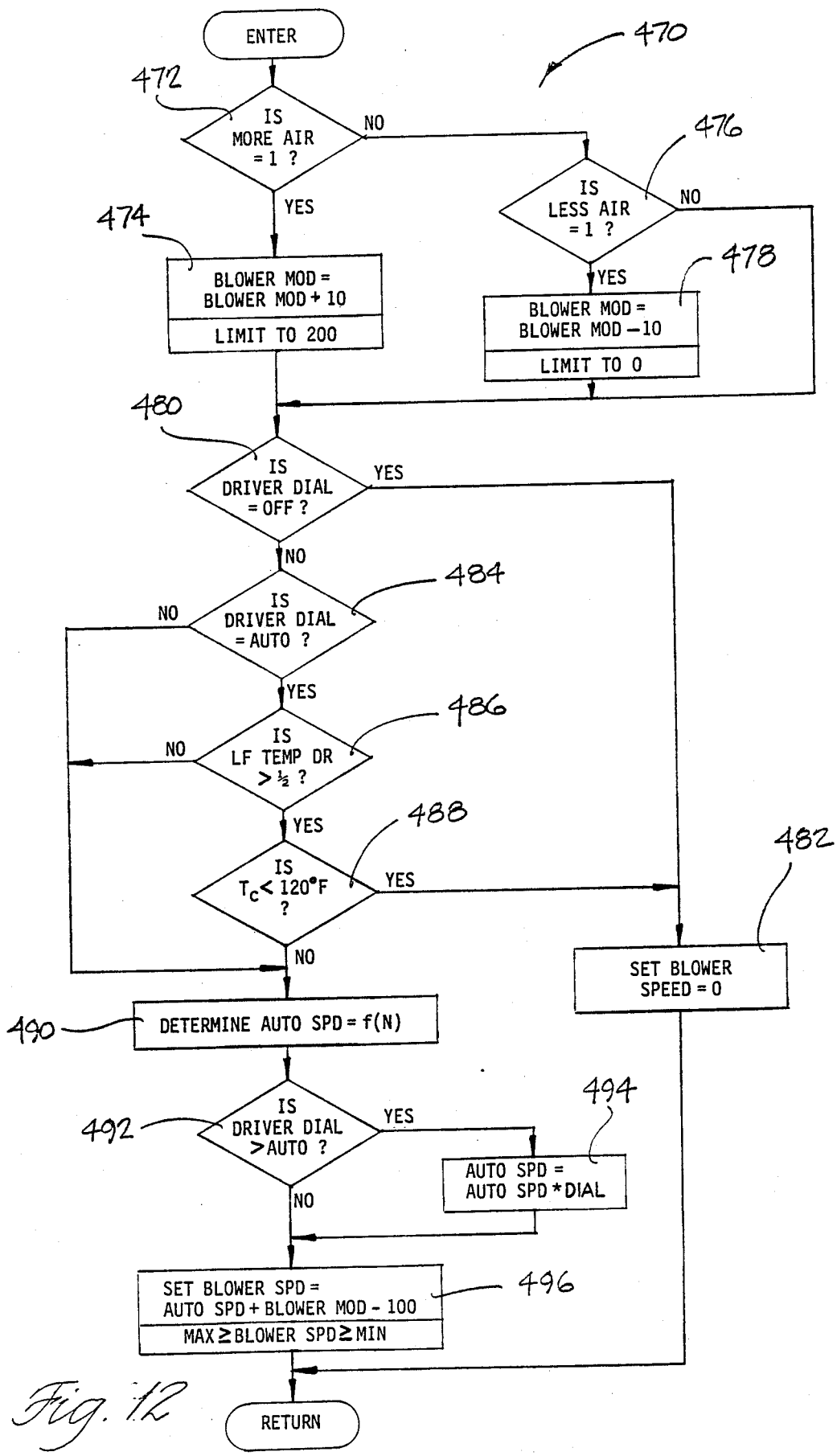

As indicated, the temperature door routine is depicted in FIG. 7, the mode door routine is depicted in FIG. 8, the hot water valve routine is depicted in FIG. 9, the inlet door routine is depicted in FIG. 10, the compressor control routine is depicted in FIG. 11, and the blower speed routine is depicted in FIG. 12. Thereafter the instruction block 262 is executed to generate and output electrical control signals for the various control elements referred to above. This includes, among other things, the generation of a compressor displacement control signal for compressor 32, based on the desired evaporator pressure and the measured evaporator temperature.

The blocks generally designated by reference numeral 264 refer to a START FLAG, the status of which indicates if the engine is in a warm-up period. Initially, if the START FLAG is set by the initialization instruction block 240. Once the engine run time exceeds one minute, as determined by the decision block 266 however, the instruction block 268 is executed to clear the START FLAG. As indicated by the various flow diagram lines, the blocks 242-262 are repeatedly executed during the period of vehicle operation.

Figure 5:
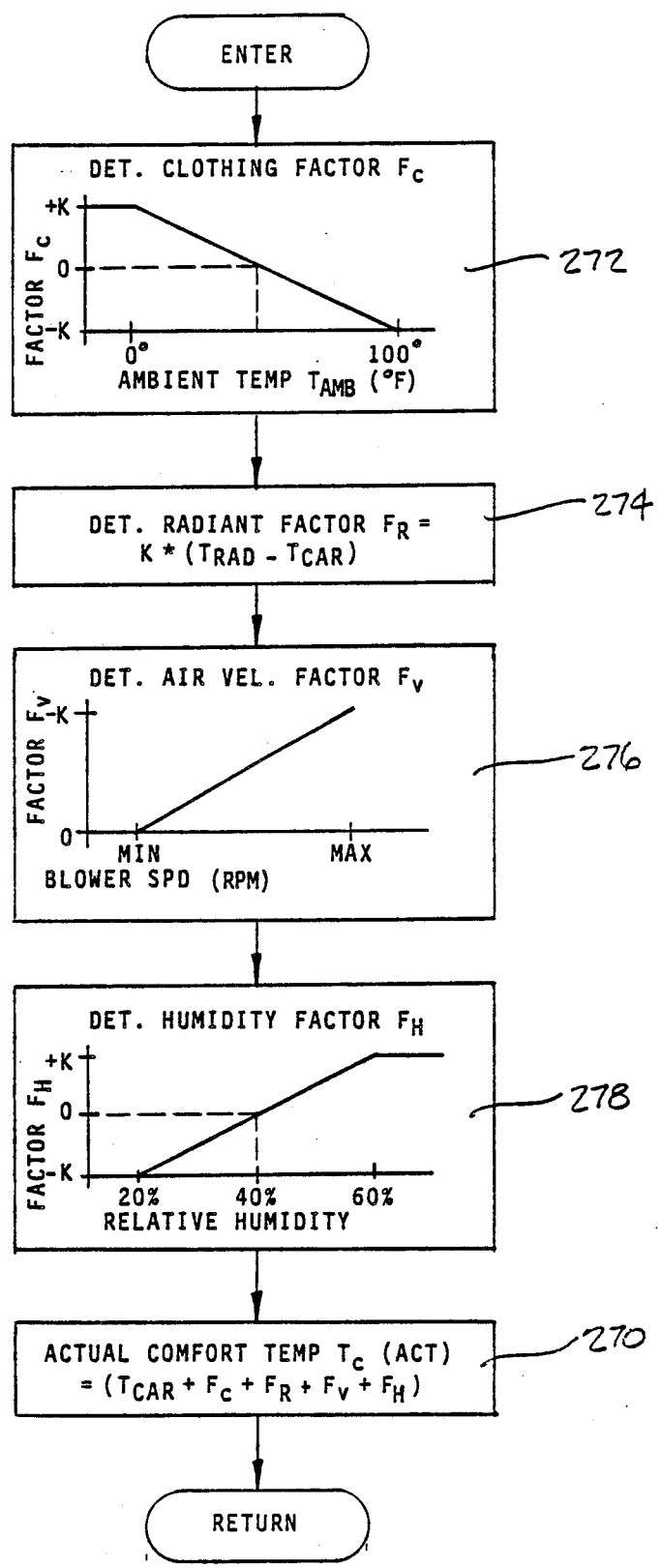

Referring now to the flow diagram of FIG. 5, the determination of the actual comfort temperature in the vehicle involves the determination of several factors. The factors include a clothing factor $F_c$, a radiant load factor $F_R$, an air velocity factor $F_v$, and a humidity factor $F_H$. The various factors are summed with a measure of the in-car temperature ($T_{CAR}$), as indicated at the block 270, to determine the actual comfort temperature $T_c(ACT)$.

The clothing factor $F_c$ is deduced as a function of the ambient or outside temperature $T_{AMB}$, as shown at block 272. At relatively cold ambient temperatures, the factor $F_c$ is positive in sign, increasing to a maximum value of $+K$; at relatively high ambient temperatures the factor $F_c$ is negative in sign decreasing to a maximum negative value of $-K$.

The radiant load factor $F_R$ is determined as a function of the difference between the sun load indication $T_{RAD}$ and the in-car temperature indication $T_{CAR}$, as indicated at the block 274. In such block, the term K is indicated as a scaling term.

The air velocity factor $F_v$ is determined as a function of the commanded blower speed in RPM, as indicated at the block 276. The factor $F_v$ varies between zero at the minimum blower speed, and K at the maximum blower speed.

The humidity factor $F_H$ is determined as a function of the relative humidity input, as indicated at the block 278. At relatively low humidity, the factor $F_H$ is negative in sign, decreasing to a maximum negative value of $-K$ at 20% humidity. At relatively high humidity levels, the factor $F_H$ is positive in sign, increasing to a maximum value of $+K$ at 60% relative humidity.

The actual comfort temperature $T_c(ACT)$ thus represents an accurate assessment of the comfort level in the vehicle. It is used, as described below in reference to FIG. 6, in relation to the desired comfort setting(s) to determine the required control response and to determine if an overcapacity or undercapacity condition is present. As indicated above in reference to FIG. 3a, the control variable used according to this invention to schedule the proper system response is the control number N.

The flow diagram of FIG. 6 represents the program instruction for determining the value of the control number N. Initially, the blocks designated generally by the reference numeral 280 are executed to determine if the temperature dial of the driver control panel 182 is set at the extreme positions of its travel. If it is set at the C designation, as determined by the decision block 282, the driver is requesting full cooling capacity of the system and the instruction block 284 is executed to set the control number N equal to zero. As indicated in the graph of FIG. 3a, this serves to activate the AC mode of operation, to control the blower motor 60 to full speed, to control the compressor 32 to its maximum capacity, to fully open the cold temperature door so that no air passes through the heater core 12, and to position the inlet air door to the inside (recirculate) position.

If the driver dial is set at the H designation, as determined at decision block 286, the instruction block 288 is executed to set the control number N equal to 100. As indicated in the graph of FIG. 3a, this serves to activate the heat (or defrost) mode of operation, to set the blower speed at its maximum level, to control the compressor 32 to its minimum capacity, to adjust the temperature door assembly to its fully closed position (so that all of the driver air passes through the heater core 12), and to set the inlet door control to the outside air (OSA) position. If the driver dial is set on the H or C designations, execution of the remainder of the flow diagram is skipped, as indicated by the flow diagram line 290.

The flow diagram portion designated generally by the reference numeral 292 determines the value of the control number N for the scheduled control of this invention. As indicated at the instruction block 94, the control number N is computed according to the sum of three system dependent factors $F_D$, $F_{CT}$ and $F_A$, and a scaling factor $K_S$.

The factor $F_{CT}$ is determined as a function of the actual comfort temperature $T_c(ACT)$ determined at instruction block 270 of FIG. 5. As indicated at block 296, the factor $F_{CT}$ is negative in sign and varies from a value of zero at an actual comfort temperature of 60 degress to a value of $-K$ at an actual comfort temperature of 90 degrees.

The factor $F_A$ is determined as a function of the ambient temperature $T_{AMB}$. As indicated at instruction block 298, the factor $F_A$ is negative in sign and varies from a value of zero when the ambient temperature is zero degrees F. to a value of $-K$ when the ambient temperature is 115 degrees F.

The factor $F_D$ is determined as a function of the upper dial position of the driver control panel 182, at least when the dial is not set at the C or H designations. This factor thus pertains to the desired comfort temperature set by the driver of the vehicle. As indicated at the block 300, it is positive in sign and varies from zero at the lowest temperature setting (60 degrees F.) to a value of K at the highest temperature setting (90 degrees F.).

The control number N, as defined at block 294, is primarily indicative of the error between the actual comfort temperature in the vehicle and the desired comfort temperature set by the driver of the vehicle. In addition, the value of the control number N is compensated by the factor $F_A$ for fluctuations in the ambient temperature, and scaled by the factor $K_S$ so that the control number N has a value of approximately 50 (depending on the ambient temperature), when the actual and desired comfort temperatures are substantially equal. This results in substantially minimum blower speed, minimum air conditioning capacity, a roughly midway position of the temperature door assembly shutters, and an inlet door position corresponding to outside air.

The flow diagram portion generally designated by the reference numeral 302 operates to determine if an overshoot condition or a stall condition is present. A timer register internal to CONTROL UNIT 200 is used to time an interval of 15 seconds. If the timer value is less than 15 seconds, as determined at decision block 304, the instruction block 306 is executed to increment the timer and the remainder of the flow diagram is skipped, as indicated by the flow diagram line 308. Once the timer has been incremented to 15 seconds, the instruction block 310 is executed to reset the timer to zero, to store the last value of the temperature error $E_T$ in the variable $E_T(LAST)$, and to compute the new or present error $E_T(NEW)$ according to the difference between the driver desired comfort temperature $T_D$ and the actual comfort temperature $T_c(ACT)$.

Thus, the value of the variable $E_T(LAST)$ corresponds to the temperature errorr 15 seconds ago and the value of the variable $E_T(NEW)$ corresponds to the current temperature error. If the current temperature error $E_T(NEW)$ is within the modification range described above in reference to FIG. 3b as determined at decision block 312, the flow diagram portion designated generally by the reference numeral 314 is executed to determine if an overshoot or a stall condition is present. If the present temperature error $E_T(NEW)$ is not in the modification range, the instruction block 316 is executed to set the stall factor $F_S$ and the overshoot factor $F_O$ equal to zero, and the remainder of the routine is skipped as indicated by the flow diagram line 290.

Referring now more particularly to the flow diagram portion 314, the decision block 318 is first executed to determine if the magnitude (absolute value) of the current temperature error $E_T(NEW)$ is greater than the magnitude (absolute value) of the last temperature error $E_T(LAST)$. If so, the temperature error is increasing, indicating that an overshoot condition is present. If the engine run time is at least one minute, as determined at decision block 320, the instruction block 322 is then executed to determine an overshoot factor $F_O$ as a function of the difference between the current temperature error $E_T(NEW)$ and the last temperature error $E_T(LAST)$. The error difference over a 15 second interval provides an effective measure of the rate of increase in the temperature error.

As indicated at the block 322, the overshoot factor $F_O$ has a positive value of up to $+10$ if the error is increasing in the negative direction, and a negative value of up to $-10$ if the temperature error is increasing in the positive direction. If it is determined at decision block 318 that the temperature error is not increasing or that the engine run time is less than one minute, the instruction block 324 is executed to set the overshoot factor $F_O$ equal to zero.

Once the overshoot factor $F_O$ is determined, the decision block 326 is executed to determine if the current temperature error $E_T(NEW)$ is approximately equal to the last temperature error $E_T(LAST)$. If so, the error is substantially constant, indicating a stall or undercapacity condition. If the engine has been running at least one minute, as determined at decision block 328, the instruction block 330 is executed to determine a stall factor $F_S$ as a function of the current temperature error $E_T(NEW)$. As indicated at the block 330, the stall factor $F_S$ is negative in sign up to a value of $-K$ when the temperature error is negative, and positive in sign up to a value of $+K$ when the temperature error is positive. If the engine run time is less than one minute, the remainder of the routine is skipped, as indicated by the flow diagram line 308. If it is determined at decision block 326 that the current temperature error $E_T(NEW)$ is not substantially equal to the last temperature error $E_T(LAST)$, a stall condition is not indicated and the instruction block 332 is executed to set the stall factor $F_S$ equal to zero.

So long as the engine has been running for at least one minute, as determined at decision blocks 320 and 328, the instruction block 334 is then executed to compute a modified control number N according to the sum of the previously determined control number N, the overshoot factor $F_O$ and the stall factor $F_S$, completing the routine. The operation and effect of the overshoot and stall factors $F_O$ and $F_S$ is described below in reference to the system operation.

It should be understood that in the foregoing descriptions, the term K has been used generically. That is, the various factors may be scaled differently or have different limits, as required to deliver the desired performance level in any given control system.

As indicated above in reference to FIG. 4, the flow diagram of FIG. 7 determines the required position of the various shutters of temperature door assembly 100. Initially, the driver (LF) temperature door position is determined as a function of the control number N, and a left-front sun load factor $LF_{SUN}$, as indicated at the instruction block 338.

Thereafter, the temperature door settings for the right-front, left-rear and right-rear passenger locations are determined, as generally designated by the flow diagram portions 340, 342 and 344, respectively. Such flow diagram portions are substantially identical in operation and are illustrated with respect to the right-front passenger portion 340. Initially the decision block 346 is executed to determine if the temperature dial of the right-front control panel 186 is set to a value less than or equal to (colder than) the standard (STD) or midpoint setting. If so, the instruction block 348 is executed to determine the right-front temperature door position as a function of the control number N, the dial setting and a right-front sun load factor $RF_{SUN}$. If the right-front temperature dial is set to a value greater than the standard or midpoint setting, the passenger at that location is requesting extra heat and the instruction block 350 is executed to determine the right-front temperature door position as a function of a predetermined control number setting corresponding to the door position at which heat begins to be added, and the right-front dial setting.

The flow diagram of FIG. 8 determines the shutter position for the mode door assembly 146, as indicated in the flow diagram of FIG. 4. The decision block 360 is first executed to determine if the dial 190 of the driver control panel 182 is set to the OFF position. If so, the mode door reverts to its default position and the remainder of the routine is skipped, as indicated by the flow diagram line 362. If not, the decision block 364 determines if the dial 190 is set to a value between the automatic (AUTO) and defrost (DEF) settings. If so, the instruction block 366 is executed to determine the mode door position as a function of the dial setting. As indicated at block 366, the heat (H) outlet position is used when the dial is nearest the AUTO setting and the defrost (D) outlets are used when the dial 190 is set at the defrost (DEF) position, with a substantially linear proportioning therebetween.

If the dial 190 of the driver control panel 182 is at the automatic (AUTO) setting, the decision block 368 is executed to determine from the condensation sensor if there is moisture on the windshield of the vehicle. If so, the instruction block 370 is executed to set the mode door position to the defrost state. If not, the decision block 372 is executed to determine if the windshield temperature ($T_{GLASS}$) is less than or equal to the dew point. If not, there is very little likelihood of fogging and the mode door position is set as a function of the control number N, as indicated at instruction block 374. If the glass temperature is at least 10 degrees less than the dew point, as determined at decision block 376, the instruction block 378 is executed to set the mode door to the full defrost position. If the glass temperature is within 10 degrees of the dew point, the mode door position is determined as a substantially linear function of the difference between the dew point and the glass temperature, as indicated at the instruction block 380.

The flow diagram of FIG. 9 operates to determine the required position of the hot water valve 20, as indicated in the flow diagram of FIG. 4. The decision block 382 is first executed to determine if the mode dial 190 of the driver control panel 182 is set to the OFF position. If so, the instruction block 384 is executed to set the water valve to an off position, completing the routine. If the driver dial 190 is not in the off position and the control number N is greater than 15, as determined by the decision block 386, the decision block 388 is executed to set the hot water valve to the on position.

The decision blocks 390–398 define the criteria for setting the water valve to the off position. Essentially the water valve is set to the off position only if the control number N is less than or equal to 10, and none of the passengers are requesting additional heat. Otherwise the water valve 20 is left in the on position.

The flow diagram of FIG. 10 determines the desired position of shutter 68 of the inlet control assembly 62 as indicated in the main flow diagram of FIG. 4. The decision blocks 400–408 and the decision block pair designated generally by the reference numeral 410 define the criteria for moving the shutter 68 to a position other than the outside air (OSA) position. The instruction block 412 is executed to set the door to the outside air (OSA) position if the driver dial 190 is set to the OFF position (block 400), the START FLAG is set (block 402), if smoke is sensed in the passenger compartment of the vehicle (block 404), if the ambient temperature $T_{AMB}$ is less than 70 degrees F. (block 406), or the control number N is greater than 30 (block 408).

The decision blocks 410 and 412, along with the decision blocks 414 and 416, define the hysteresis graphically depicted in FIG. 3a. If the control number N rises above the value of 22 (block 410) and the shutter 68 is in the inside or recirculation (REC) position (block 411), the instruction block 412 is executed to move the shutter to the outside air position. Conversely, if the control number N is less than 10 (block 414) and the shutter 68 is in the outside air position (block 416), the instruction block 418 is executed to move the shutter to the recirculate (REC) position. If the control number N is less than 2, as determined by the decision block 420, the instruction block 418 is executed to set the shutter 68 to the fully recirculated position.

In the hysteresis region between the control numbers values of 10 and 22, the instruction block 422 is executed to schedule the position of shutter between the outside air (OSA) and recirculate (REC) positions as a function of the blower outlet air temperature $T_{BL}$. This region is shown in broken lines in FIG. 3a to indicate that the shutter is neither in the fully recirculated nor fully outside air position.

The flow diagram of FIG. 11 pertains to the control of the refrigerant compressor 32, as indicated in the main flow diagram of FIG. 4. The flow diagram portion designated generally by the reference numeral 430 defines the criteria for enabling or disabling the compressor clutch 50, and the flow diagram portion designated generally by the reference numeral 432 pertains to the compressor displacement control. If the dial 190 of the driver control panel 182 is in the OFF position, as determined at decision block 432, the instruction block 434 is executed to disengage the compressor clutch 50.

The instruction block 434 is also executed to disable the compressor clutch 50 to prevent icing if the ambient temperature $T_{AMB}$ is less than or equal to 32 degrees F., as determined by the decision block 436. If the criteria defined by decision blocks 432 and 436 are satisfied, the decision block 438 is executed to determine if the driver temperature door is more than half-way open, indicating a heating mode of operation. If so, the decision block 440 is executed to determine if the coolant temperature $T_c$ in radiator 14 is greater than 120 degrees F. If not, the heater core 12 is not capable of adding a substantial amount of heat to the ventilation air, and the instruction block 434 is executed to disable the compressor clutch 50. If the coolant temperature $T_c$ is greater than 120 degrees F., the decision blocks 442 and 444 are executed to determine if the compressor 32 may be safely operated.

The decision block 442 pertains to a head temperature $T_{HEAD}$ limit of 250 degrees F. and the decision block 444 pertains to an engine speed limit of 5000 RPM. In either case, if the limit values are exceeded, the instruction block 444 is executed to disable the compressor clutch 50; if the limits have not been exceeded, the instruction block 446 is executed to enable the compressor clutch 446.

Referring now to the flow diagram portion 432, the decision block 448 is first executed to determine if the glass temperature $T_{GLASS}$ is less than the dew point. If so, the instruction block 450 is executed to set the desired evaporator pressure $P_e$ of the air conditioning system 30 at a minimum value MIN, and to set a MINIMUM PRESSURE FLAG. The instruction block 450 is also executed if the condensation sensor indicates that there is moisture on the windshield, as indicated by the decision block 452. The decision block 454 is then executed to determine if the vehicle humidity is greater than 40%. If so, the decision blocks 456 and 458 are executed to set a MAXIMUM HUMIDITY FLAG and to set the desired evaporator pressure $P_e$ at a maximum value MAX.

If the vehicle humidity falls below 35%, as determined by the decision block 460, the instruction block 462 is executed to reset the maximum humidity flag and to set the desired evaporator pressure $P_e$ as a function of the control number N in accordance with the schedule of FIG. 3a. If the humidity is between 35% and 40%, the decision block 464 is executed to determine if the MAXIMUM HUMIDITY FLAG is set. If so, the instruction block 466 is executed to set the desired evaporator pressure to its minimum level MIN; if not, the instruction block 462 is executed to set the desired evaporator pressure $P_e$ as a function of the control number N as described above.

The flow diagram of FIG. 12 determines the desired speed of the blower motor 60, as indicated in the main loop flow diagram of FIG. 4. The flow diagram portion designated generally by the reference numeral 470 serves to increase or decrease the blower speed in accordance with the driver actuation of the air control arrows on the driver control panel 182. If the up arrow is depressed, as determined at decision block 472, the instruction block 474 is executed to increase the blower modification number by a value of ten, limiting the blower modification value to a value of 200. If the down arrow is depressed, as determined by the decision block 476, the instruction block 478 is executed to decrease the value of the blower modification by ten, limiting its value to zero. Thereafter, the decision block 480 is executed to determine if the dial 190 of the driver control panel 182 is set to the OFF position. If so, the instruction block 482 is executed to set the blower speed to zero.

If the driver dial 190 is in the AUTO position, as determined by the decision block 484, the driver temperature door is more than half-way open as determined by decision block 486, and the coolant temperature $T_c$ is less than 120 degrees F. as determined by the decision block 488, the instruction block is also executed to set the blower speed to zero. If the criteria defined by decision blocks 484–488 are not met, the instruction block 490 is executed to determine the automatic speed (AUTO) of the blower motor as a function of the control number N in accordance with the schedule depicted in the graph of FIG. 3a. Thereafter, the decision block 492 is executed to determine if the driver dial 190 is set to a position between the automatic setting (AUTO) and the defrost setting (DEF). If so, the blower speed is determined according to the product of the speed determined at instruction block 490 and a factor determined as a function of the actual dial setting DIAL as indicated by the instruction block 494. Otherwise instruction block 496 is executed to set the blower speed in accordance with the sum of the AUTO speed setting determined at instruction block 490 and the blower modification setting determined by the flow diagram portion 470. The blower speed is limited between minimum and maximum values MIN and MAX as indicated.

The operation of the scheduled and adaptive controls of this invention will now be described for a typical period of vehicle operation in cold ambient temperature. When the vehicle operation is initiated, there is a relatively large error between the actual comfort temperature in the vehicle $T_c(ACT)$ and the desired comfort temperature setting. This results in a relatively high value for the control number N, and the CONTROL UNIT 200 operates to fully close the shutters of temperature door assembly 100, to set the air conditioning system 30 to its lowest capacity setting, and to set the inlet air control assembly 62 to the outside air (OSA) position. The shutter position of the mode door assembly 146 is determined as a function of the setting of the driver control panel dial 190. The AUTO position corresponds to the heat mode, and the DEF position corresponds to the defrost mode, with linear proportioning therebetween. In addition, the blower motor speed is set to its maximum (HI) value following a warm-up period of the engine.

As the engine begins producing heat and the radiator coolant passing through the heater core 12 begins to warm the passenger compartment of the vehicle, the comfort temperature error $E_T$ begins to decrease. This produces a reduction in the value of the control number N and the CONTROL UNIT 200 responds by progressively reducing the blower motor speed and adjusting the positions of the temperature door assembly shutters in accordance with the scheduled control. Under normal conditions, this serves to smoothly bring the actual comfort level of the vehicle into correspondence with the desired comfort temperature indicated by the driver control panel 182. At that point, the control number N will have a value of approximately 50 resulting in a relatively low blower speed and an intermediate position of the temperature door assembly shutters. Although the adaptive control is active, as soon as the actual comfort temperature is brought to within ten degrees F. of the desired comfort temperature $T_D$, it is ineffective to modify the scheduled control number N since neither overshoot nor stall conditions are indicated.

If an undercapacity condition occurs as the passenger compartment is being warmed in the preceding example, the HVAC system will be unable to increase the actual comfort temperature $T_c(ACT)$ of the vehicle up to the desired comfort temperature $T_D$ using the scheduled control. If the actual comfort temperature $T_c(ACT)$ is within ten degrees F. of the desired comfort temperature $T_D$, however, the adaptive control of this invention will be effective to increase the value of the control number N via the stall factor $F_S$. The stall factor $F_S$ has a limited range of authority (plus or minus K), but serves to adaptively modify the scheduled control so that the HVAC system can achieve the desired comfort temperature setting.

Similarly, if an overcapacity condition occurred in the example described above, there would be an overshoot of the actual comfort temperature $T_c(ACT)$ with respect to the desired comfort temperature $T_D$. In such case, the adaptive control of this invention would be effective to modify the operation of the scheduled control by further reducing the value of the control number N using the overshoot factor $F_O$. The amount of correction in such case is determined in proportion to the rate of change in the temperature error $E_T$. This serves to increase the cooling capacity of the HVAC system thereby eliminating the overshoot of the desired comfort setting. As soon as the magnitude of the temperature error $E_T$ is no longer increasing, the overshoot factor $F_O$ is reset to zero.

The stall and overshoot adaptive control functions of this invention are bidirectional. In the cold ambient temperature example described above, the adaptive control of this invention operated to increase the heating capacity in a stall conditon and to increase the cooling capacity in an overshoot condition. In operation under high ambient temperatures, the opposite effect would be observed. That is, the adaptive control would be effective to increase the cooling capacity of the system in a stall condition and to increase the heating capacity of the system in an overshoot condition. In any event, the adaptive modifications are inhibited when the temperature error $E_T$ is within a deadband of values about the desired comfort temperature $T_D$ as indicated by the shaded area in the graph of FIG. 3b.

While this invention has been described in reference to the illustrated embodiment, it will be understood that the scope of this invention is not limited thereto, and in addition, that various modifications will occur to those skilled in the art. In this regard, it will be understood that the scope of this invention is defined solely by the appended claims.

The embodiments of the invention in which an exclusive property or privilege is claimed are defined as follows:

1. In a motor vehicle ventilation system having elements controllable to adjust the heating/cooling capacity of the system, an automatic control for operating the controllable elements to regulate the heating/cooling capacity at an optimal level which brings the actual comfort level in the vehicle into agreement with a desired comfort level and thereafter maintains such agreement, the control comprising:

means for determining the desired comfort level, the actual comfort level, and a comfort level error indication according to the difference between the desired and actual comfort levels;

scheduled control means for operating the controllable elements as a function of the comfort level error indication according to an empirically determined schedule designed to regulate the heating/cooling capacity of the system at said optimal level; and adaptive control means effective when the system heating/cooling capacity level brought about by said scheduled control means significantly deviates from said optimal level, resulting in an uncorrected comfort level error indication, for modifying the scheduled operation of the controllable elements in relation to the comfort level error indication so as to bias the heating/cooling capacity of the system toward said optimal level, thereby adaptively correcting the operation of the controllable elements for variations in the system performance and the heating/cooling requirements of the vehicle which are not accounted for by the scheduled control means.

2. The control set forth in claim 1, wherein the adaptive control means comprises:

means effective when the magnitude of the comfort level error indication is increasing due to an overcapacity condition in which the heating/cooling capacity level brought about by the scheduled control means significantly exceeds said optimal level for modifying the operation of the scheduled control means in relation to the rate of increase in the comfort level error indication so as to bias the heating/cooling capacity of the system toward said optimal level.

3. The control system set forth in claim 2, wherein:

the modification of the scheduled control means effected by the adaptive control means is inhibited when the actual comfort level is within a deadband defined in relation to the desired comfort level.

4. The control set forth in claim 1, wherein the adaptive control means comprises:

means effective when the actual comfort level is outside of a deadband defined in reference to the desired comfort level, and the time rate of change in the comfort level error indication is less than a reference rate of change due to an undercapacity condition in which said optimal heating/cooling capacity level significantly exceeds the heating/cooling capacity level brought about by the scheduled control means for modifying the operation of the scheduled control means in relation to the magnitude of the comfort level error indication so as to bias the heating/cooling capacity of the system toward said optimal level.

5. The control set forth in claim 1, wherein the adaptive control means includes means for defining a modification range threshold in relation to the desired comfort level, and for inhibiting the modification of the scheduled control means when the magnitude of the comfort level error indication exceeds the modification range threshold.

6. In a motor vehicle ventilation system having elements controllable to adjust the heating/cooling capacity of the system, an automatic control for operating the controllable elements to regulate the heating/cooling capacity at an optimal level which brings the actual comfort temperature in the vehicle into agreement with a desired comfort temperature and thereafter maintains such agreement, the control comprising:

means for determining the desired comfort temperature, the actual comfort temperature, and a comfort temperature error indication according to the difference between the desired and actual comfort temperatures;

scheduled control means for generating a control factor N in relation to the comfort temperature error indication, and for operating the controllable elements according to an predetermined schedule based on said control factor N, the scheduled being empirically determined for regulating the heating/cooling capacity of the system at said optimal level; and adaptive control means effective when the system heating/cooling capacity level brought about by said scheduled control means significantly deviates from said optimal level, resulting in an uncorrected comfort temperature error indication, for modifying the control factor N in relation to the comfort temperature error indication so as to bias the heating/cooling capacity of the system toward said optimal level, thereby adaptively correcting the operation of the controllable elements for variations in the system performance and the heating/cooling requirements of the vehicle which are not accounted for by the scheduled control means.

7. The control set forth in claim 6, wherein the adaptive control means comprises:

means effective when the magnitude of the comfort temperature error indication is increasing due to an overcapacity condition in which the heating/cooling capacity level brought about by the scheduled control means significantly exceeds said optimal level for modifying the control factor N in relation to the rate of increase in the comfort temperature error indication so as to bias the heating/cooling capacity of the system toward said optimal level.

8. The control system set forth in claim 7, wherein:

the modification of the control factor N by the adaptive control means is inhibited when the actual comfort temperature is within a deadband defined in relation to the desired comfort temperature.

9. The control set forth in claim 6, wherein the adaptive control means comprises:

means effective when the actual comfort temperature is outside of a deadband defined in reference to the desired comfort temperature, and the time rate of change in the comfort temperature error indication is less than a reference rate of change due to an undercapacity condition in which said optimal heating/cooling capacity level significantly exceeds the heating/cooling capacity level brought about by the scheduled control means for modifying the control factor N in relation to the magnitude of the comfort temperature error indication so as to bias the heating/cooling capacity of the system toward said optimal level.

10. The control set forth in claim 6, wherein the adaptive control means includes means for defining a modification range threshold in relation to the desired comfort temperature, and for inhibiting the modification of the control factor N when the magnitude of the comfort temperature error indication exceeds the modification range threshold.

* * * * *